US011535074B2

(12) United States Patent
Tighare et al.

(10) Patent No.: US 11,535,074 B2
(45) Date of Patent: Dec. 27, 2022

(54) AGRICULTURAL VEHICLE WITH ADJUSTABLE GROUND CLEARANCE AND A METHOD THEREOF

(71) Applicant: MAHINDRA & MAHINDRA LIMITED, Mohali (IN)

(72) Inventors: Avinash Tighare, Mohali (IN); Vikas Singh, Mohali (IN)

(73) Assignee: MAHINDRA & MAHINDRA LIMITED, Mohali (IN)

( * ) Notice: Subject to any disclaimer, the term of this patent is extended or adjusted under 35 U.S.C. 154(b) by 0 days.

(21) Appl. No.: 17/275,272

(22) PCT Filed: Sep. 12, 2019

(86) PCT No.: PCT/IN2019/050664
§ 371 (c)(1),
(2) Date: Mar. 11, 2021

(87) PCT Pub. No.: WO2020/053891
PCT Pub. Date: Mar. 19, 2020

(65) Prior Publication Data
US 2021/0260946 A1    Aug. 26, 2021

(30) Foreign Application Priority Data
Sep. 12, 2018  (IN) .............................. 201811034458

(51) Int. Cl.
*B60G 3/14*   (2006.01)
*B60G 1/00*   (2006.01)
*B60G 17/005* (2006.01)

(52) U.S. Cl.
CPC ................. *B60G 3/14* (2013.01); *B60G 1/00* (2013.01); *B60G 17/005* (2013.01);
(Continued)

(58) Field of Classification Search
CPC .......... B60G 3/14; B60G 1/00; B60G 17/005; B60G 2200/132; B60G 2204/46;
(Continued)

(56) References Cited

U.S. PATENT DOCUMENTS 8,042,817 B2 * 10/2011 Motebennur ...... B62D 49/0678
280/5.514
2011/0049263 A1 * 3/2011 Vander Zaag ......... A01B 63/22
239/172

(Continued)

FOREIGN PATENT DOCUMENTS

| EP | 1468899 A2 * | 10/2004 | ............... B60G 5/02 |
| WO | WO-9608959 A1 * | 3/1996 | ........... B60G 21/067 |
| WO | WO-2017205949 A1 * | 12/2017 | ............. A01B 63/00 |

*Primary Examiner* — James A English
*Assistant Examiner* — Scott F. Underwood
(74) *Attorney, Agent, or Firm* — Amster, Rothstein & Ebenstein LLP

(57) ABSTRACT

An agricultural vehicle V with adjustable ground clearance and a method 70 thereof is provided. The agricultural vehicle V includes a vehicular structure C, a pair of front wheels FW, a pair of rear wheels RW, at least one front axle, at least one rear axle, a pair of final drive housings FH, a plurality of locking elements LP and an extension arrangement E. The vehicular structure C is configured to be moved between at least one lowered position in which each final drive housing FH is locked to the vehicular structure C at corresponding first locking positions, and at least one raised position in which each final drive housing FH is locked to the vehicular structure C at corresponding second locking positions. The extension arrangement E adapted to be coupled between corresponding front wheels FW and a front axle when vehicular structure C is at the raised position.

7 Claims, 5 Drawing Sheets

(52) U.S. Cl.
CPC .... *B60G 2200/132* (2013.01); *B60G 2204/46* (2013.01); *B60G 2300/082* (2013.01); *B60G 2500/30* (2013.01)

(58) Field of Classification Search
CPC ........ B60G 2300/082; B60G 2300/124; B60G 2500/30; B60G 2800/01; B62D 49/0678
See application file for complete search history.

(56) References Cited

U.S. PATENT DOCUMENTS

| | | | |
|---|---|---|---|
| 2011/0089647 A1* | 4/2011 | Peterson | B60B 35/14 280/6.157 |
| 2015/0102569 A1* | 4/2015 | Slawson | A01M 7/0042 280/5.514 |
| 2015/0102593 A1* | 4/2015 | Slawson | B60G 3/01 280/830 |
| 2016/0096407 A1* | 4/2016 | Dames | B60G 7/008 280/838 |
| 2016/0311284 A1* | 10/2016 | Osborne | B60G 17/005 |
| 2017/0203628 A1* | 7/2017 | Dames | B60G 17/0165 |
| 2017/0210268 A1* | 7/2017 | Kangas | B60G 17/017 |
| 2018/0281549 A1* | 10/2018 | Kerner | B60G 11/27 |
| 2020/0361269 A1* | 11/2020 | Slawson | B62D 49/0607 |

* cited by examiner

Moving a vehicular structure C between at least one lowered position, where the vehicular structure C is closer to the ground, and at least one raised position, where the vehicular structure C is above the lowered position (step 72)

Locking the vehicular structure C at at least one of the lowered position and the raised position by locking at least one final drive housing FH at corresponding locking positions in the vehicular structure C (step 74)

Coupling an extension arrangement E between corresponding front wheels FW and at least one front axle (step 76)

AGRICULTURAL VEHICLE WITH ADJUSTABLE GROUND CLEARANCE AND A METHOD THEREOF

CROSS-REFERENCE TO RELATED APPLICATIONS

This application is a U.S. national stage entry under 35 U.S.C. § 371 of PCT International Patent Application No. PCT/IN2019/050664, filed Sep. 12, 2019, which claims priority to Indian Patent Application No. 201811034458, filed Sep. 12, 2018, the contents of which are incorporated herein by reference in their entirety.

TECHNICAL FIELD

The embodiments herein relate to an agricultural vehicle with adjustable ground clearance and a method for adjusting ground clearance of an agricultural vehicle.

BACKGROUND

Agriculture has a tremendous need for tractors having various characteristics. This need has been met primarily by building a wide variety of tractors, including wheeled and tracked, of various heights and configurations. The conventional tractor has the limitation of working in standing crops for intercultural operations due to its low ground clearance. During inter-culture operations, the tractor does not have the flexibility to adjust the ground clearance to suit the crop heights, which would result in damaging the standing crop. The customized high ground clearance tractor has other limitations and cannot perform like a conventional tractor. Furthermore, conventional agricultural vehicles have a fixed ground clearance and if the operator aims to increase the ground clearance for specific requirement, the operator has to either go for a permanent change in ground clearance of the vehicle or needs to choose a different vehicle with required ground clearance.

Therefore, there exists a need for an agricultural vehicle with adjustable ground clearance, which obviates the aforementioned drawbacks. Further, there exists a need for a method for adjusting ground clearance of an agricultural vehicle.

OBJECTS

The principal object of an embodiment of this invention is to provide an agricultural vehicle with adjustable ground clearance.

Another object of an embodiment of this invention is to provide a method for adjusting ground clearance of an agricultural vehicle.

These and other objects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments of the invention are illustrated in the accompanying drawings, throughout which like reference letters indicate corresponding parts in the various figures. The embodiments herein will be better understood from the following description with reference to the drawings, in which:

FIG. 4 depicts a flowchart showing the steps of a method for adjusting ground clearance of an agricultural vehicle, according to an embodiment of the invention as disclosed herein.

DETAILED DESCRIPTION

Figure 1:
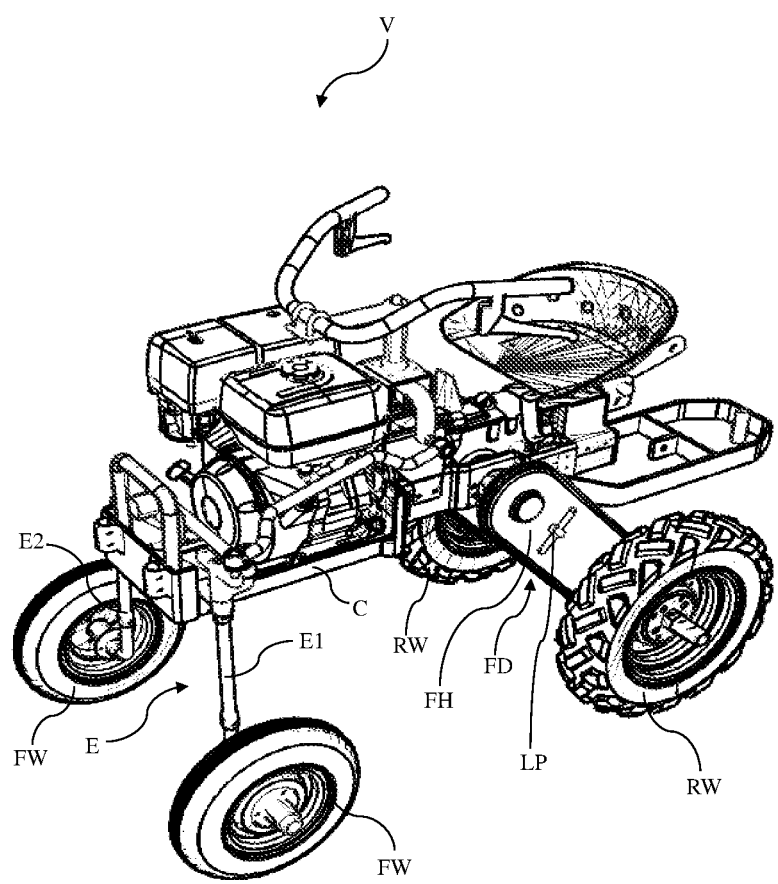
FIG. 1 depicts a perspective view of an agricultural vehicle, where a vehicular structure is at a raised position, according to an embodiment of the invention as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve an agricultural vehicle with adjustable ground clearance. Further, embodiments herein achieve a method for adjusting ground clearance of an agricultural vehicle. Referring now to the drawings, and more particularly to FIGS. 1 through 4, where similar reference characters denote corresponding features consistently throughout the figures there are shown embodiments.

Figure 2:
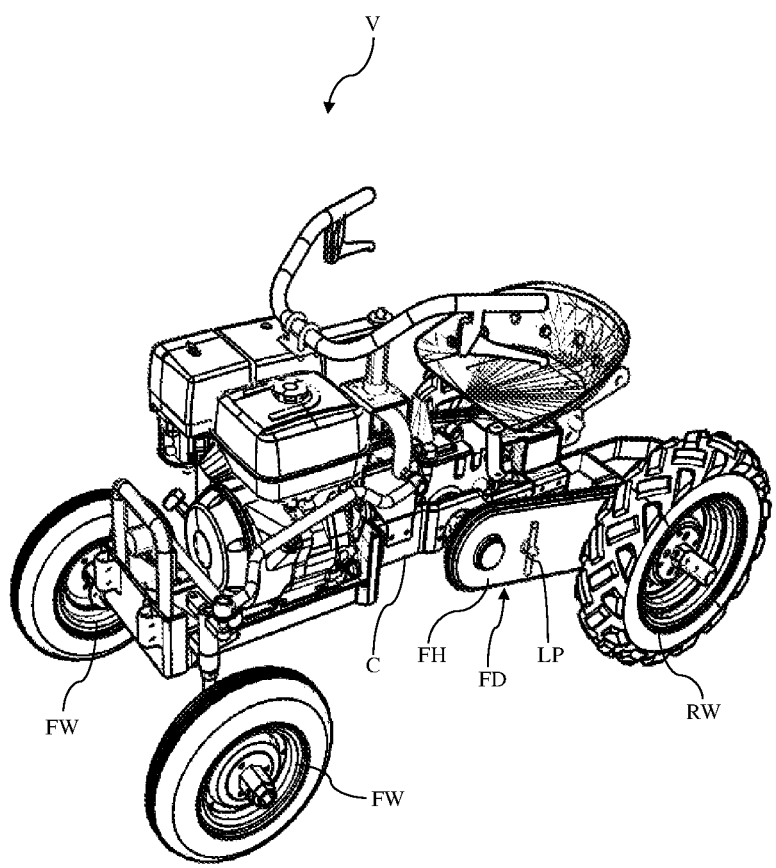
FIG. 2 depicts a perspective view of the agricultural vehicle, where the vehicular structure is in a lowered position, according to an embodiment of the invention as disclosed herein.
Figure 3A:
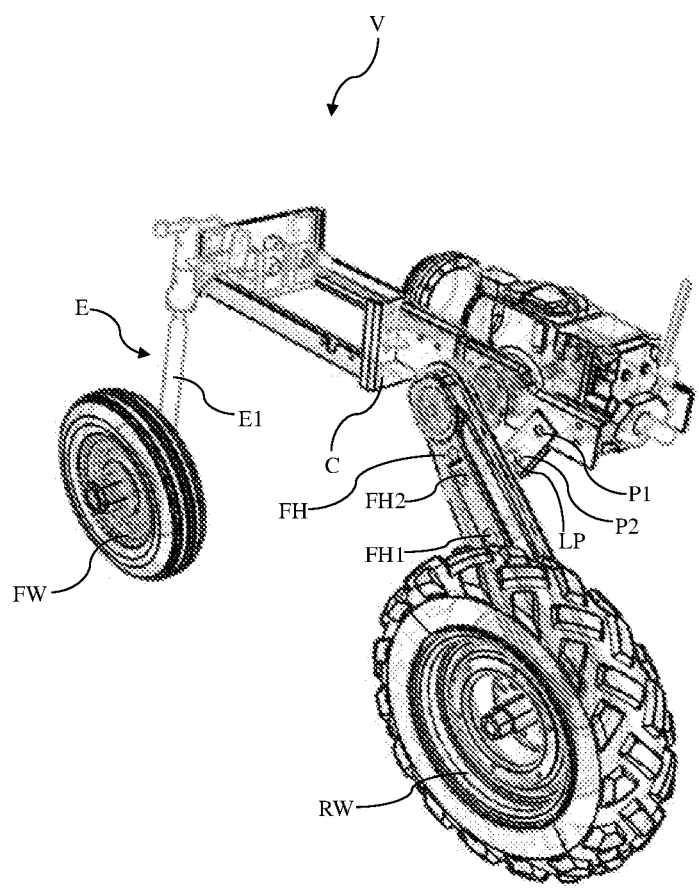
FIGS. 3a and 3b depict partial perspective views of the vehicular structure of the agricultural vehicle at the raised position, according to the embodiments of the invention as disclosed herein.
Figure 3B:
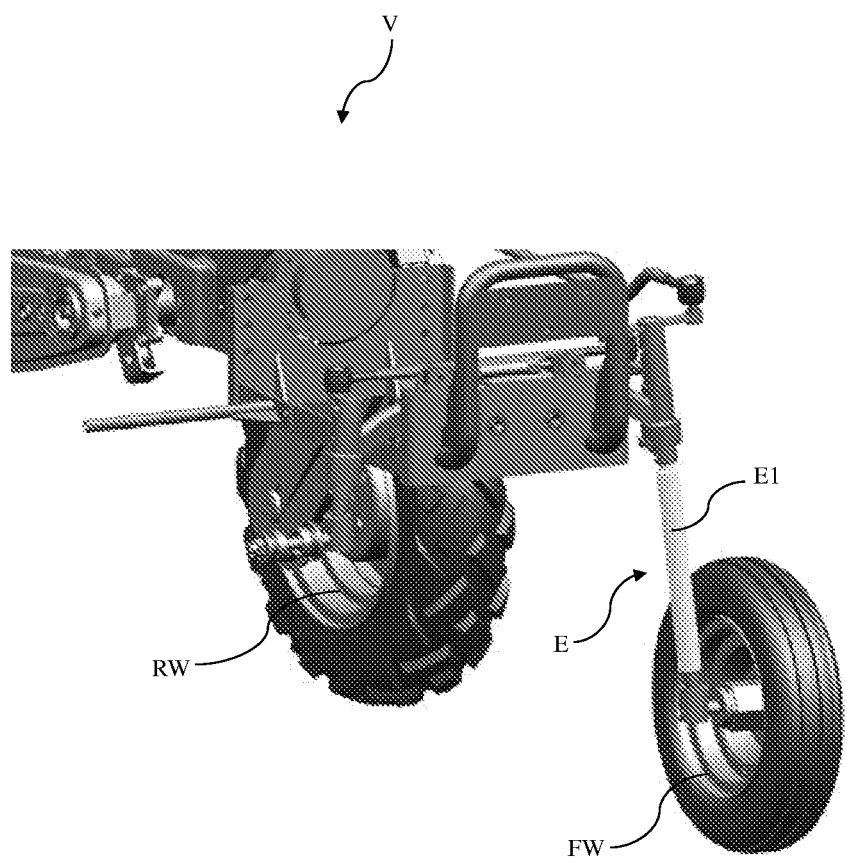

FIG. 1 depicts a perspective view of an agricultural vehicle, where a vehicular structure is at a raised position, according to an embodiment of the invention as disclosed herein. The vehicle V includes a vehicular structure C (as shown in FIG. 1 to FIG. 3a), a pair of front wheels FW (as shown in FIG. 1 to FIG. 3b) and a pair of rear wheels RW (as shown in FIG. 1 to FIG. 3b), at least one front axle (not shown), at least one rear axle (not shown), a pair of final drive assemblies FD (as shown in FIG. 1 to FIG. 3a), a plurality of locking elements LP (only one of which is shown in FIG. 1 and FIG. 2), an extension arrangement E (as shown in FIG. 1, FIG. 3a and FIG. 3b) and may include other standard components and mechanisms as present in a standard vehicle. For the purpose of this description and ease of understanding, the vehicle 10 with adjustable ground clearance is explained herein below with reference to an agricultural vehicle. However, it is also within the scope of the invention to implement/practice the components and mechanisms of the vehicle V and method (as disclosed in this description) to be followed for adjusting the ground clearance, in an off-road vehicle, an agricultural harvester and any other type of vehicle without otherwise deterring the intended function of the agricultural vehicle V and method for adjusting the ground clearance of the agricultural vehicle V as can be deduced from the description and corresponding drawings.

The vehicular structure C forms the base structure of the vehicle V which supports other assemblies of the vehicle V. The vehicular structure C is configured to be moved between at least one lowered position in which each final drive housing FH is locked to the vehicular structure C at corresponding first locking positions, and at least one raised position in which each final drive housing C is locked to the vehicular structure C at corresponding second locking positions. The vehicular structure C includes a plurality of locking points (P1 and P2, as shown in FIG. 3a) at a defined pitch circle diameter having a rear axle pivot axis as center point. The lowered position of the vehicular structure C is achieved by locking each final drive housing FH at corresponding each first locking point P1 in the vehicular structure C. The raised position of the vehicular structure C is achieved by locking each final drive housing FH at corresponding each second locking point P2 in the vehicular structure C. The vehicular structure C is at least a chassis frame.

The pair of front wheels FW and the pair of rear wheels RW are indirectly supported by the vehicular structure C. The front axle (not shown) and the rear axle (not shown) are supported by the vehicular structure C.

Each final drive assembly FD includes a final drive housing FH (as shown in FIG. 1 to FIG. 3a) and includes other standard components as present in a standard final drive assembly. The pair of final drive housings FH are coupled between the rear axle (not shown) and the rear wheels RW. One end of each final drive housing FH is pivoted to the rear axle (not shown). Another end of each final drive housing FH is coupled to corresponding each rear wheel RW. Each final drive housing FH is locked to the vehicular structure C at corresponding each first locking point P1 (only one of which is shown in FIG. 3a) when the vehicular structure C is at the lowered position. Each final drive housing FH is locked to the vehicular structure C at corresponding each second locking point P2 (only one of which is shown in FIG. 3a) when the vehicular structure C is at the raised position. Each final drive housing FH defines a plurality of locking member receiving portions (FH1 and FH2). The locking member receiving portion FH1 of each final drive housing FH is adapted to receive corresponding each locking element LP therethrough to couple with corresponding each first locking point P1 to lock each final drive housing FH with the vehicular structure C when the vehicular structure C is at the lowered position. Another locking member receiving portion FH2 of each final drive housing FH is adapted to receive corresponding each locking element LP therethrough to couple with corresponding each second locking point P2 to lock each final drive housing FH with the vehicular structure C when the vehicular structure C is at the raised position. Each locking member receiving portion (FH1 and FH2) of each final drive housing FH is at least an opening (through hole).

Each locking element LP is adapted to lock corresponding each final drive housing FH to the vehicular structure C at at least one of corresponding each first locking point P1 and corresponding each second locking point P2 therein to restrict a relative movement between each final drive housing FH and the vehicular structure C when the vehicular structure C is at the lowered position and the raised position respectively. In an embodiment, each locking element LP is at least a locking pin. It is also within the scope of the invention to provide any other type of locking arrangement between corresponding each final drive housing FH and the vehicular structure C without otherwise deterring the intended function of locking each final drive housing FH with the vehicular structure C as can be deduced from the description and corresponding drawings.

In an embodiment, the extension arrangement E is adapted to be coupled between corresponding front wheels FW and corresponding front axle (not shown) when the vehicular structure C is at the raised position. The extension arrangement E comprises a pair of extension members (E1 and E2, as shown in FIG. 1, FIG. 3a and FIG. 3b) adapted to be coupled between corresponding front wheels FW and corresponding front axle (not shown) when the vehicular structure C is at the raised position, where one end of each extension member (E1 and E2) is connected to corresponding each kingpin (not shown) and another end of each extension member (E1 and E2) is connected to corresponding each stub axle (not shown) of the vehicle V. The extension members (E1 and E2) of the extension arrangement E are dis-engaged from corresponding kingpin (not shown) and corresponding stub axle (not shown) when the vehicular structure C is at the lowered position. It is also within the scope of the invention to provide any of a telescopic tubular arrangement, a hydraulic cylinder mechanism, an electro-hydraulic actuator mechanism, an electro-pneumatic actuator mechanism, a telescopic adjustable arrangement, an adjustable extendable and retractable arrangement, an adjustable screw arrangement, an electric motor with an extendable and retractable shaft, a linear adjustable arrangement, an adjustable linear actuator, a hydraulic actuator, a pneumatic actuator, a telescopic cylinder mechanism, an electro-hydraulic actuator system, an electro-pneumatic actuator system, an adjustable linear actuator and an adjustable linear control mechanism, to be coupled between corresponding front wheels FW and corresponding front axle (not shown) for moving a front-end of the vehicular structure C between the raised position and the lower position.

FIG. 4 depicts a flowchart showing the steps of a method 70 for adjusting ground clearance of a vehicle V, according to an embodiment of an invention as disclosed herein. In an embodiment, the method 70 for adjusting ground clearance of the vehicle V is as follows, the method 70 comprises, moving a vehicular structure C between at least one lowered position, where the vehicular structure C is closer to the ground, and at least one raised position, where the vehicular structure C is above the lowered position (step 72), locking the vehicular structure C at at least one of the lowered position and the raised position by locking at least one final drive housing FH at corresponding locking positions in the vehicular structure C (step 74) and coupling an extension arrangement E between corresponding front wheels FW and at least one front axle (step 76). The method 70 includes unlocking at least one final drive housing FH from the vehicular structure C prior to the method step (72) of moving the vehicular structure C between at least one lowered position and at least one raised position.

Therefore, a vehicle V with adjustable ground clearance and a method 70 for adjusting ground clearance of a vehicle V is provided.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

We claim:

1. A vehicle V with adjustable ground clearance, the vehicle V comprising:
    a vehicular structure C; and
    a pair of final drive housings FH adapted to be coupled between at least one rear axle and corresponding rear wheels RW,
    wherein
    said vehicular structure C includes a plurality of locking points (P 1 and P 2) at a defined pitch circle diameter having a rear axle pivot axis as center point; and
    said vehicular structure C is configured to be moved between at least one lowered position in which each of said final drive housing FH is locked to said vehicular structure C at corresponding first locking positions, and at least one raised position in which each of said final drive housing FH is locked to said vehicular structure C at corresponding second locking positions.

2. The vehicle V as claimed in claim 1, comprising an extension arrangement E adapted to be coupled between corresponding front wheels FW and corresponding front axle when said vehicular structure C is at the raised position.

3. The vehicle V as claimed in claim 2, wherein said extension arrangement E comprises a pair of extension members (E 1 and E 2) adapted to be coupled between said corresponding front wheels FW and said corresponding front axle when said vehicular structure C is at the raised position.

4. The vehicle V as claimed in claim 1, wherein one end of each of said final drive housing FH is pivoted to the rear axle; and
    another end of each of said final drive housing FH is coupled to corresponding each rear wheel RW.

5. The vehicle V as claimed in claim 1, wherein each of said final drive housing FH is locked to said vehicular structure C at corresponding each first locking point P 1 when said vehicular structure C is at the lowered position.

6. The vehicle V as claimed in claim 5 comprising a plurality of locking elements LP,
    wherein
    each of said locking element LP is adapted to lock corresponding each final drive housing FH to said vehicular structure C at at least one of corresponding each first locking point P 1 and corresponding each second locking point P 2 when said vehicular structure C is at the lowered position and the raised position respectively.

7. The vehicle V as claimed in claim 1, wherein each of said final drive housing FH is locked to said vehicular structure C at corresponding each second locking point P 2 when said vehicular structure C is at the raised position.

* * * * *